(12) United States Patent
Huang et al.

(10) Patent No.: US 12,259,576 B2
(45) Date of Patent: Mar. 25, 2025

(54) SEMICONDUCTOR WAVEGUIDES AND METHODS OF FORMING THE SAME

(71) Applicant: Taiwan Semiconductor Manufacturing Company, Ltd., Hsinchu (TW)

(72) Inventors: Yuan-Sheng Huang, Taichung (TW); Shih-Chang Liu, Kaohsiung County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 233 days.

(21) Appl. No.: 17/664,525

(22) Filed: May 23, 2022

(65) Prior Publication Data

US 2023/0375782 A1    Nov. 23, 2023

(51) Int. Cl.
*G02B 6/122*    (2006.01)
*G02B 6/136*    (2006.01)
*G02B 6/12*    (2006.01)

(52) U.S. Cl.
CPC ............. *G02B 6/122* (2013.01); *G02B 6/136* (2013.01); *G02B 2006/12061* (2013.01)

(58) Field of Classification Search
None
See application file for complete search history.

(56) References Cited

U.S. PATENT DOCUMENTS

| 2010/0166362 | A1* | 7/2010 | Fujii | G02B 6/4214 |
| | | | | 264/1.24 |
| 2013/0163918 | A1* | 6/2013 | Won | G02B 6/262 |
| | | | | 438/31 |
| 2017/0338622 | A1* | 11/2017 | Kitajima | H01S 5/2275 |
| 2020/0110230 | A1* | 4/2020 | Cha | G02B 6/42 |
| 2021/0018702 | A1* | 1/2021 | Yanagisawa | G02B 6/4214 |
| 2022/0075113 | A1* | 3/2022 | Zandi | G02B 6/12007 |

FOREIGN PATENT DOCUMENTS

| JP | 2001264561 A | * | 9/2001 | ........... G02B 6/1228 |
| JP | 2021128981 A | * | 9/2021 | ............... G02B 6/12 |

* cited by examiner

*Primary Examiner* — Chris H Chu
(74) *Attorney, Agent, or Firm* — Harrity & Harrity, LLP

(57) ABSTRACT

Depositing a side slab structure on a cladding layer before etching a supporting dielectric prevents tapering of a silicon waveguide during etching of the supporting dielectric and a substrate. For example, the side slab structure may be deposited over the silicon waveguide and the cladding layer after etching the cladding layer. As a result, when an electronic device is integrated ex situ on the substrate, wave intensity and/or total internal reflection is improved, which improves an efficiency of the electronic device.

13 Claims, 20 Drawing Sheets

300

SEMICONDUCTOR WAVEGUIDES AND METHODS OF FORMING THE SAME

BACKGROUND

Photonic devices, such as light-emitting devices like light-emitting diodes (LEDs) and light-absorbing devices like pixels, may be fitted within recesses on a substrate in order to form a photonic array.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
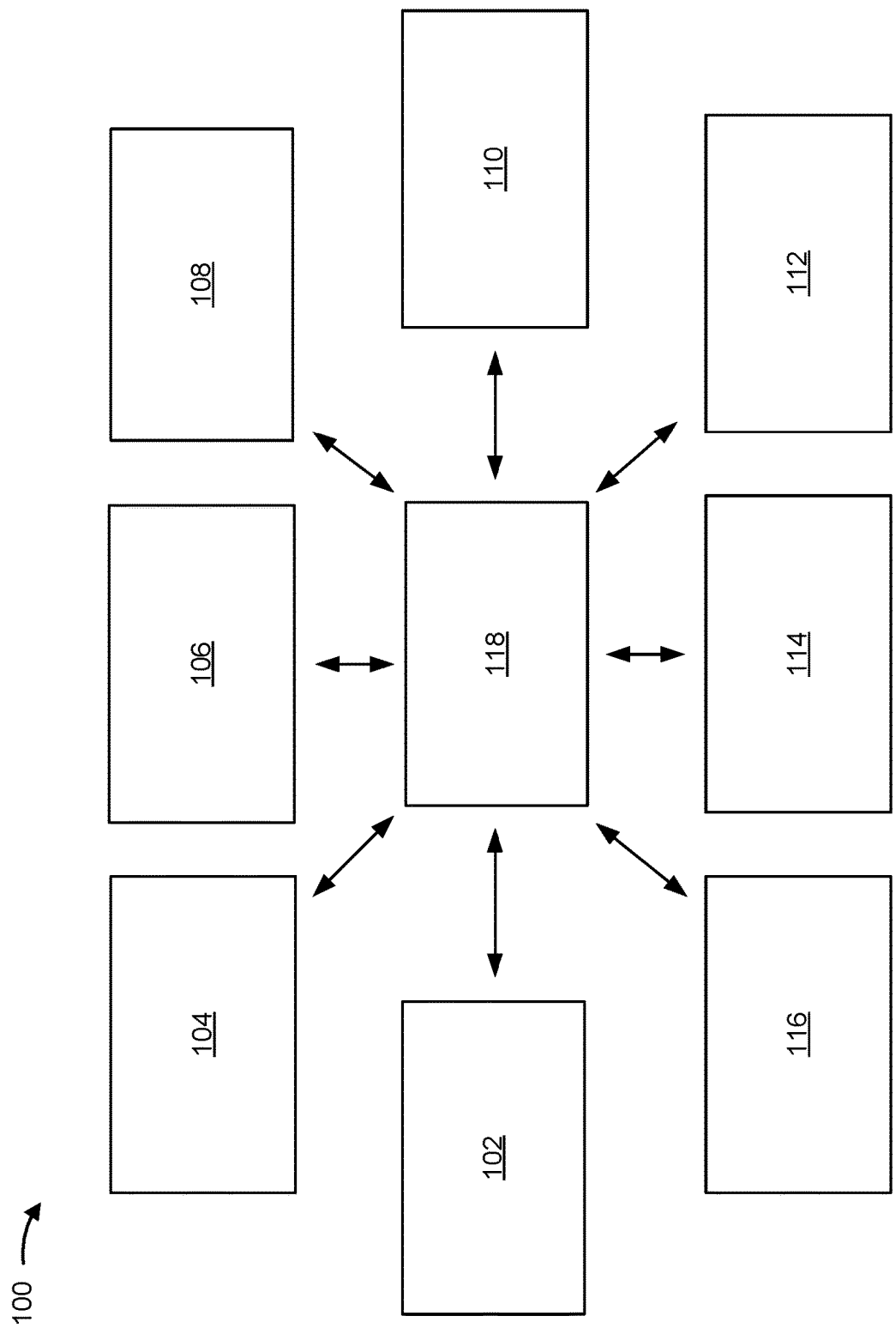
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some cases, an electronic device, such as a light-emitting diode (LED) or an optical pixel, may be integrated ex situ on a silicon substrate with a silicon waveguide formed thereon. Additionally, a lower dielectric layer may isolate the waveguide from the substrate, and a cladding layer may isolate the waveguide from a photoresist layer.

However, during etching of the lower dielectric and/or the silicon substrate to form a recess for the electronic device, the waveguide may be tapered. The waveguide profile (e.g., a sidewall of the silicon waveguide) may be tapered or notched due to photoresist shrinkage and lateral etching of a sidewall of the cladding layer during etching of the lower dielectric layer, particularly for devices with a small critical dimension. Tapering results in wave intensity loss and/or loss of total internal reflection, which reduces an efficiency of the electronic device. In some cases, the tapering may be sufficient to cause the electronic device to fail.

Some implementations described herein provide techniques and apparatuses for depositing a side slab structure on the cladding layer before etching the lower dielectric. The side slab structure prevents tapering of the waveguide during etching of the lower dielectric and the silicon substrate. For example, the side slab structure may be deposited over the waveguide and the cladding layer after etching the cladding layer. As a result, wave intensity and/or total internal reflection is improved, which improves an efficiency of the electronic device.

FIG. 1 is a diagram of an example environment 100 in which systems and/or methods described herein may be implemented. The example environment 100 includes semiconductor processing tools that can be used to form semiconductor structures and devices, such as a conductive structure as described herein.

As shown in FIG. 1, environment 100 may include a plurality of semiconductor processing tools 102-116 and a wafer/die transport tool 118. The plurality of semiconductor processing tools 102-116 may include a deposition tool 102, an exposure tool 104, a developer tool 106, an etch tool 108, a planarization tool 110, a plating tool 112, an ion implantation tool 114, and/or another semiconductor processing tool. The tools included in the example environment 100 may be included in a semiconductor clean room, a semiconductor foundry, a semiconductor processing and/or manufacturing facility, or another location.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool, such as a plasma-enhanced CVD (PECVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or another type of exposure tool. The exposure tool 104 may expose a photoresist layer to the radiation source to transfer a pattern from a photomask to the photoresist layer.

The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or another type of etch tool. In some implementations, the etch tool 108 includes a chamber that is filled with an etchant, and the substrate is placed in the chamber for a particular time period to remove particular amounts of one or more portions of the substrate. In some implementations, the etch tool 108 etches one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The ion implantation tool 114 is a semiconductor processing tool that is capable of implanting ions into a substrate. The ion implantation tool 114 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The photoresist removal tool 116 is a semiconductor processing tool that is capable of etching a photoresist layer. In some implementations, the photoresist removal tool 116 includes a chamber that is filled with a chemical stripper, and a substrate with the photoresist layer is placed in the chamber for a particular time period to remove the photoresist layer. In some implementations, the photoresist removal tool 116 etches the photoresist layer using plasma ashing.

The wafer/die transport tool 118 includes a mobile robot, a robot arm, a tram or rail car, an overhead hoist transfer (OHT) vehicle, an automated material handling system (AMHS), and/or another type of tool that is used to transport wafers and/or dies between semiconductor processing tools 102-116 and/or to and from other locations such as a wafer rack, a storage room, or another location. In some implementations, the wafer/die transport tool 118 is a programmed tool to travel a particular path and/or may operate semi-autonomously or autonomously.

The number and arrangement of tools shown in FIG. 1 are provided as one or more examples. In practice, there may be additional tools, fewer tools, different tools, or differently arranged tools than those shown in FIG. 1. Furthermore, two or more tools shown in FIG. 1 may be implemented within a single tool, or a single tool shown in FIG. 1 may be implemented as multiple, distributed tools. Additionally, or alternatively, a set of tools (e.g., one or more tools) of environment 100 may perform one or more functions described as being performed by another set of tools of environment 100.

Figure 2:
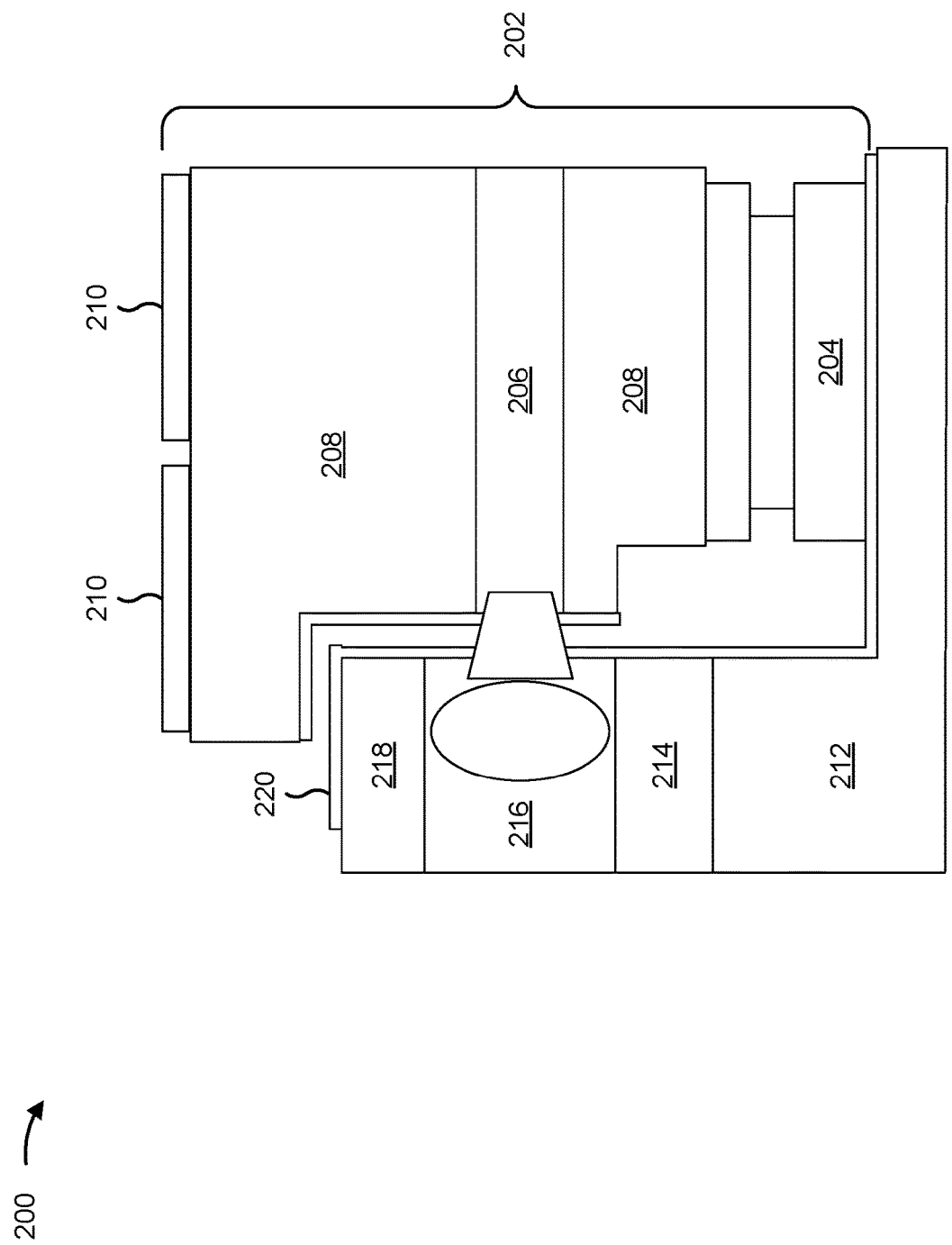
FIG. 2 is a diagram of an example semiconductor structure described herein.

FIG. 2 is a diagram of an example photonic structure 200 described herein. In some implementations, the photonic structure 200 may be included in an array. For example, the array may be included in an image sensor, such as a complementary metal-oxide-semiconductor (CMOS) image sensor, a back side illuminated (BSI) CMOS image sensor, or another type of image sensor. In another example, the array may be included in an LED array.

As shown in FIG. 2, the photonic structure 200 may include a photonic device 202. For example, the photonic device 202 may include a light-emitting device like an LED or a light-absorbing device like a pixel, a sensor, or a detector. As further shown in FIG. 2, the photonic device 202 may include a support structure 204, such as an under bump metallization (UBM) layer. Additionally, an active region 206 of the photonic device 202 may generate photons from electric input (e.g., for light-emitting devices) or may generate electric signals from absorbed photons (e.g., for light-absorbing devices).

The active region 206 may be included between bonded dies 208. For example, the dies 208 may have been stacked together (e.g., using package-on-package (PoP) and system-in-package (SiP) packaging techniques). Accordingly, contacts 210 formed on the dies 208 may provide an outlet for generated photons (e.g., for light-emitting devices) or may absorb photons (e.g., for light-absorbing devices).

The photonic device 202 may be placed ex situ in a recess on a substrate 212. The substrate 212 may include a semiconductor die substrate, a semiconductor wafer, or another type of substrate in which semiconductor pixels may be formed. In some implementations, the substrate 212 is formed of silicon (Si) (e.g., a silicon substrate), a material including silicon, a III-V compound semiconductor material such as gallium arsenide (GaAs), a silicon on insulator (SOI), or another type of semiconductor material.

In some implementations, the photonic device 202 is additionally surrounded by a supporting dielectric layer 214. The dielectric layer 214 may include a silicon nitride ($SiN_x$), an oxide (e.g., a silicon oxide ($SiO_x$) and/or another oxide material), and/or another type of dielectric material.

In order to reduce leakage of photons (either absorbed at the contacts 210 and internally reflected toward the active region 206 or generated at the active region 206 and internally reflected toward the contacts 210), a silicon waveguide 216 may reflect escaping photons back toward the active region 206.

The silicon waveguide 216 may be protected by a cladding layer 218. The cladding layer 218 may include a silicon nitride ($SiN_x$), an oxide (e.g., a silicon oxide ($SiO_x$) and/or another oxide material), and/or another type of dielectric material. In order to further protect the silicon waveguide 216 during etching of a recess for placement of the photonic device 202, a side slab structure may be formed on a side of the cladding layer 218 facing the recess (and thus facing the photonic device 202). For example, as described in connection with FIGS. 4A-4J, the side slab structure prevents tapering of the silicon waveguide 216 during etching. As a result, wave intensity and/or total internal reflection by the silicon waveguide 216 is improved, which improves an efficiency of the photonic device 202.

In some implementations, the photonic structure 200 may further include a passivation layer 220. The passivation layer 220 may have anti-reflective properties. As a result, efficiency of the photonic device 202 may be further improved because fewer photons are lost.

As indicated above, FIG. 2 is provided as an example. Other examples may differ from what is described with regard to FIG. 2.

FIGS. 3A-3D are diagrams of example semiconductor structures 300, 310, 320, and 330, respectively, as described herein. As shown in FIGS. 3A-3D, the photonic device 202 may be placed ex situ in a recess on a substrate 212. The photonic device 202 is additionally surrounded by a supporting dielectric layer 214 and a silicon waveguide 216. The silicon waveguide 216 may be protected by a cladding layer 218.

Figure 3A:
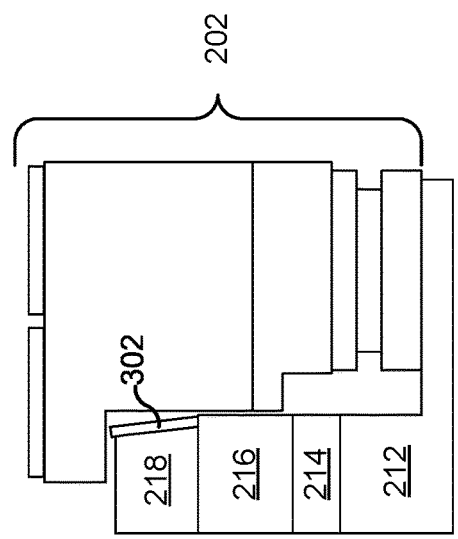
FIGS. 3A-3D are diagrams of example semiconductor structures described herein.
Figure 3A:

As shown in FIG. 3A, example structure 300 includes a side slab 302. The side slab 302 may include or be formed of metal (e.g., titanium (Ti), tantalum (Ta), and/or another metal), a metal compound (e.g., titanium nitride (TiN), tantalum nitride (TaN), another metal nitride, hafnium oxide ($HfO_x$), and/or another metal oxide), and/or another material that is selective against materials used to etch the substrate 212, the dielectric layer 214, the silicon waveguide 216, and the cladding layer 218. For example, the side slab 302 may include or be formed of a material that exhibits selectivity to silicon oxide and silicon during etching. Accordingly, at least a portion of a top surface of the side slab 302 may be higher than a top surface of the cladding layer 218, as shown in FIG. 3A. In example structure 300, the side slab 302 remains after the photonic device 202 is inserted.

Figure 3B:
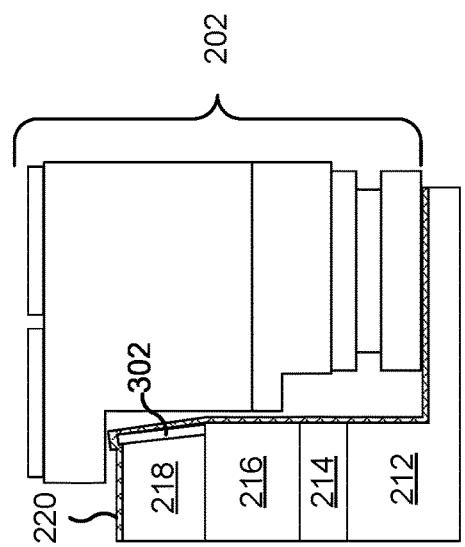

Example structure 310 of FIG. 3B is similar to example structure 300 but includes a passivation layer 220 formed (e.g., via epitaxial growth) before the photonic device 202 is inserted. Because the side slab 302 remains, the passivation layer 220 may form over the side slab 302 in addition to the cladding layer 218, an exposed surface of the substrate 212, and a sidewall of the recess in which the photonic device 202 is inserted. For example, the passivation layer 220 includes a first portion over a top surface of the side slab 302 that is higher than a second portion of the passivation layer 220 over a top surface of the cladding layer 218.

Figure 3C:
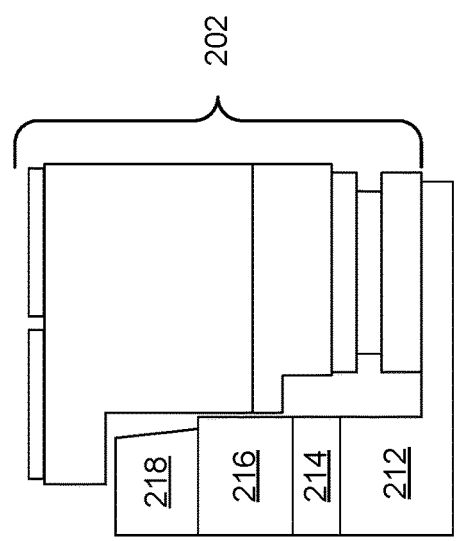
Figure 3C:

As shown in FIG. 3C, example structure 320 does not include the side slab 302 because the side slab 302 was removed (e.g., as described in connection with FIG. 4H) before the photonic device 202 is inserted. Accordingly, a top surface of the silicon waveguide 216 is at least partially exposed by the surface of the cladding layer 218 facing the photonic device 202, as shown in FIG. 3C.

Figure 3D:
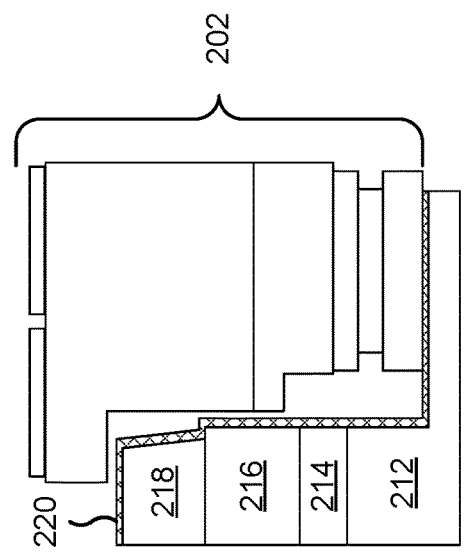

Example structure 330 of FIG. 3D is similar to example structure 320 but includes a passivation layer 220 formed (e.g., via epitaxial growth) before the photonic device 202 is inserted. Because the side slab 302 was removed, the passivation layer 220 forms over the cladding layer 218, an exposed surface of the substrate 212, and a sidewall of the recess in which the photonic device 202 is inserted. For example, the passivation layer 220 includes a first portion over an exposed portion of the top surface of the silicon waveguide 216 that is non-parallel with a second portion of the passivation layer 220 over a sidewall of the silicon waveguide 216.

As indicated above, FIGS. 3A-3D are provided as examples. Other examples may differ from what is described with regard to FIGS. 3A-3D.

FIGS. 4A-4J are diagrams of an example implementation 400 described herein. Example implementation 400 includes a process for forming a side slab to protect a silicon waveguide, as described herein.

Figure 4A:
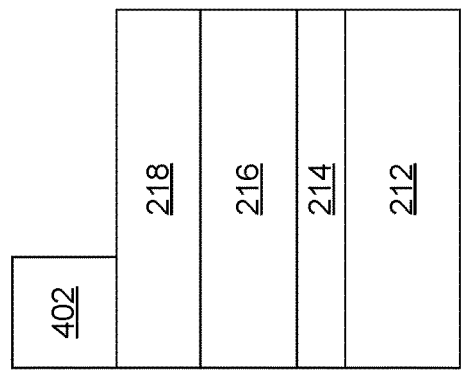
FIGS. 4A-4J are diagrams of an example implementation described herein.

As shown in FIG. 4A, the example process for forming the side slab may be performed in connection with a substrate 212. The substrate 212 may include a semiconductor die substrate, a semiconductor wafer, or another type of substrate in which semiconductor transistors may be formed. In some implementations, the substrate 212 is formed of silicon (Si) (e.g., a silicon substrate), a material including silicon, a III-V compound semiconductor material such as gallium arsenide (GaAs), a silicon on insulator (SOI), or another type of semiconductor material. In some implementations, the substrate 212 is formed of a doped material (e.g., a p-doped material or an n-doped material), such as a doped silicon. For example, the ion implantation tool 114 may dope the substrate 212 with positive ions (for p-type doping) or negative ions (for n-type doping).

Additionally, a supporting dielectric layer 214 may be formed over the substrate 212. The dielectric layer 214 may include a silicon nitride ($SiN_x$), an oxide (e.g., a silicon oxide ($SiO_x$) and/or another oxide material), and/or another type of dielectric material. Furthermore, a silicon waveguide 216 may be formed over the supporting dielectric layer 214. The silicon waveguide 216 may be protected by a cladding layer 218. The cladding layer 218 may include a silicon nitride ($SiN_x$), an oxide (e.g., a silicon oxide ($SiO_x$) and/or another oxide material), and/or another type of dielectric material.

As further shown in FIG. 4A, a photoresist layer 402 may be formed over the substrate 212. For example, the deposition tool 102 may deposit the photoresist layer 402 by a CVD technique, a PVD technique, an ALD technique, or another type of deposition technique. The planarization tool 110 may planarize the photoresist layer 402 after the photoresist layer 402 is deposited. The photoresist layer 402 may include a metal, a silicon oxide ($SiO_x$), and/or another photoresist material.

Furthermore, the photoresist layer 402 may be patterned in preparation for etching a recess for a photonic device (e.g., photonic device 202, as described herein). For example, the exposure tool 104 may expose the photoresist layer 402 to a radiation source to pattern the photoresist layer 402, and the developer tool 106 may develop and remove portions of the photoresist layer 402 to expose the pattern.

Figure 4B:
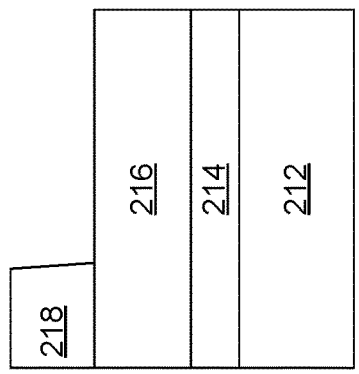

As shown in FIG. 4B, a recess is formed in the cladding layer 218. For example, the etch tool 108 may etch portions of the cladding layer 218 to form the recess. In some implementations, the etch tool 108 may use lithography to form the recess.

Additionally, the photoresist layer 402 may be etched. For example, the photoresist removal tool 116 may dissolve the photoresist layer 402 using a buffered oxide etch (BOE).

Figure 4C:
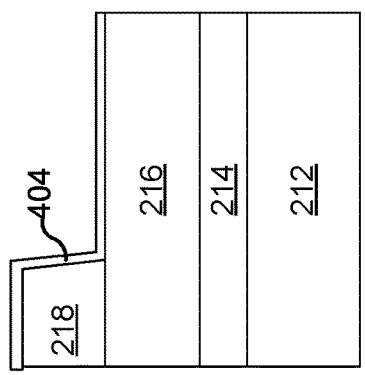

As shown in FIG. 4C, a protective layer 404 may be formed over the cladding layer 218 and an exposed surface of the silicon waveguide 216. The deposition tool 102 may deposit the protective layer 404 by a CVD technique, a PVD technique, an ALD technique, or another type of deposition technique.

Figure 4D:
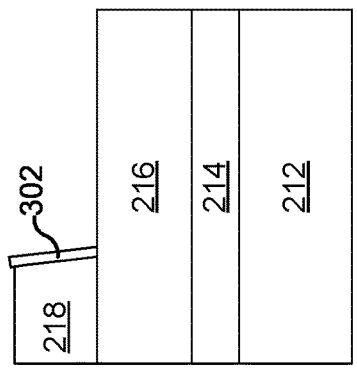
Figure 4D:

As shown in FIG. 4D, the protective layer 404 may be etched from a top surface of the cladding layer 218 and the exposed surface of the silicon waveguide 216. For example, the etch tool 108 may anisotropically etch the protective layer 404 such that the side slab 302 remains on a surface of the cladding layer 218 facing the recess. In some implementations, the etch tool 108 may perform a dry etch. Alternatively, the deposition tool 102 may form a photoresist layer on the protective layer 404, the exposure tool 104 may expose the photoresist layer to a radiation source to pattern the photoresist layer, the developer tool 106 may develop and remove portions of the photoresist layer to expose the pattern, and the etch tool 108 may etch portions of the protective layer 404 to form the side slab 302. In some implementations, the photoresist removal tool 116 removes the remaining portions of the photoresist layer (e.g., using a chemical stripper, a plasma asher, and/or another technique) after the etch tool 108 forms the side slab 302.

Figure 4E:
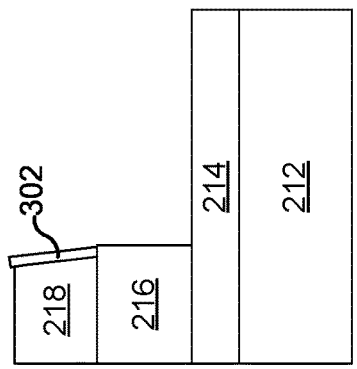

As shown in FIG. 4E, a recess is formed in the silicon waveguide 216. For example, the etch tool 108 may etch portions of the silicon waveguide 216 to form the recess. In some implementations, the etch tool 108 may anisotropically etch the silicon waveguide 216, for example, by performing a dry etch. Alternatively, the deposition tool 102 may form a photoresist layer on the silicon waveguide 216, the exposure tool 104 may expose the photoresist layer to a radiation source to pattern the photoresist layer, the developer tool 106 may develop and remove portions of the photoresist layer to expose the pattern, and the etch tool 108 may etch portions of the silicon waveguide 216 to form the recess. In some implementations, the photoresist removal tool 116 removes the remaining portions of the photoresist layer (e.g., using a chemical stripper, a plasma asher, and/or another technique) after the etch tool 108 forms the recess. As further shown in FIG. 4E, the side slab 302 prevents tapering of the silicon waveguide 216 during etching.

Figure 4F:
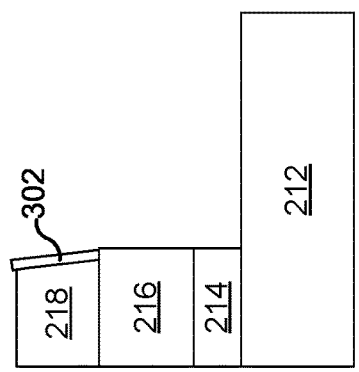
Figure 4F:

As shown in FIG. 4F, a recess is formed in the supporting dielectric 214. For example, the etch tool 108 may etch portions of the supporting dielectric 214 to form the recess. In some implementations, the etch tool 108 may anisotropically etch the supporting dielectric 214, for example, by performing a dry etch. Alternatively, the deposition tool 102 may form a photoresist layer on the supporting dielectric 214, the exposure tool 104 may expose the photoresist layer to a radiation source to pattern the photoresist layer, the developer tool 106 may develop and remove portions of the photoresist layer to expose the pattern, and the etch tool 108 may etch portions of the supporting dielectric 214 to form the recess. In some implementations, the photoresist removal tool 116 removes the remaining portions of the photoresist layer (e.g., using a chemical stripper, a plasma asher, and/or another technique) after the etch tool 108 forms recess. As further shown in FIG. 4F, the side slab 302 prevents tapering of the silicon waveguide 216 during etching.

Figure 4G:
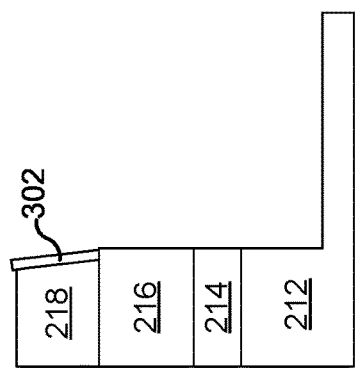

As shown in FIG. 4G, a recess is formed in the substrate 212. For example, the etch tool 108 may etch portions of the substrate 212 to form the recess. In some implementations, the etch tool 108 may anisotropically etch the substrate 212, for example, by performing a dry etch. Alternatively, the deposition tool 102 may form a photoresist layer on the substrate 212, the exposure tool 104 may expose the photoresist layer to a radiation source to pattern the photoresist layer, the developer tool 106 may develop and remove portions of the photoresist layer to expose the pattern, and the etch tool 108 may etch portions of the substrate 212 to form the recess. In some implementations, the photoresist removal tool 116 removes the remaining portions of the photoresist layer (e.g., using a chemical stripper, a plasma asher, and/or another technique) after the etch tool 108 forms recess. As further shown in FIG. 4G, the side slab 302 prevents tapering of the silicon waveguide 216 during etching.

Because the cladding layer 218 is tapered but the silicon waveguide 216 is not, a sidewall of the cladding layer 218 (e.g., facing the recess) is non-parallel relative to a sidewall of the silicon waveguide 216 (e.g., facing the recess). If the silicon waveguide 216 were to be tapered, at least a portion of the sidewall of the silicon waveguide 216 (e.g., an upper portion) would be parallel (and continuous) with the sidewall of the cladding layer 218.

Figure 4H:
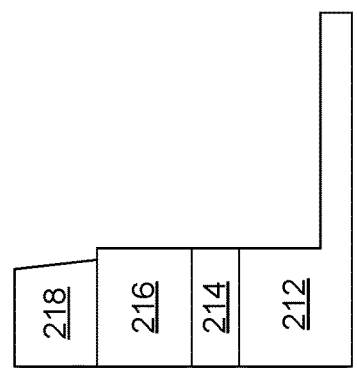
Figure 4H:

As shown in FIG. 4H, the side slab 302 may be etched. For example, the etch tool 108 may isotropically etch the side slab 302. In some implementations, the etch tool 108 may perform a wet etch and/or a dry etch. As described elsewhere, in some implementations, the side slab 302 is not etched and remains for additional operations. Leaving the side slab 302 may simplify and/or eliminate operations that would have otherwise been performed to etch the side slab 302.

Figure 4I:
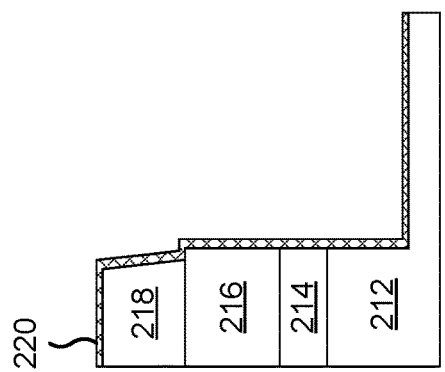
Figure 4I:

As shown in FIG. 4I, a passivation layer 220 may be formed over the cladding layer 218, an exposed surface of the silicon waveguide 216, an exposed surface of the substrate 212, and a sidewall facing the recess. The deposition tool 102 may deposit the passivation layer 220 by epitaxial growth. The passivation layer 220 may have anti-reflective properties.

Figure 4J:
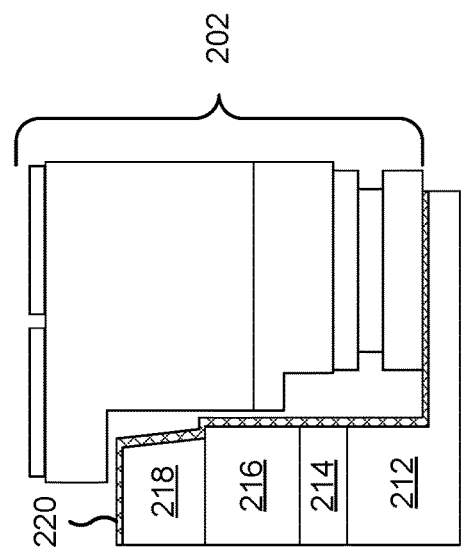

As shown in FIG. 4J, a photonic device 202 may be inserted (ex situ) into the recess in the substrate 212, the supporting dielectric 214, the silicon waveguide 216, and the cladding layer 218. Accordingly, the photonic device 202 may use the silicon waveguide 216 to improve efficiency because the silicon waveguide 216 reflects escaping photons back into an active region of the photonic device 202.

By using techniques as described in connection with FIGS. 4A-4J, the side slab 302 prevents tapering of the silicon waveguide 216 during etching of the dielectric 214 and the substrate 212. As a result, wave intensity and/or total internal reflection is improved, which improves an efficiency of the photonic device 202.

As indicated above, FIGS. 4A-4J are provided as an example. Other examples may differ from what is described with regard to FIGS. 4A-4J. For example, as described in connection with FIGS. 3A, 3B, and 5A, the side slab 302 may not be etched and instead remain after insertion of the photonic device 202. Additionally, or alternatively, as described in connection with FIGS. 3A and 3C, the passivation layer 220 may be omitted.

Figure 5A:
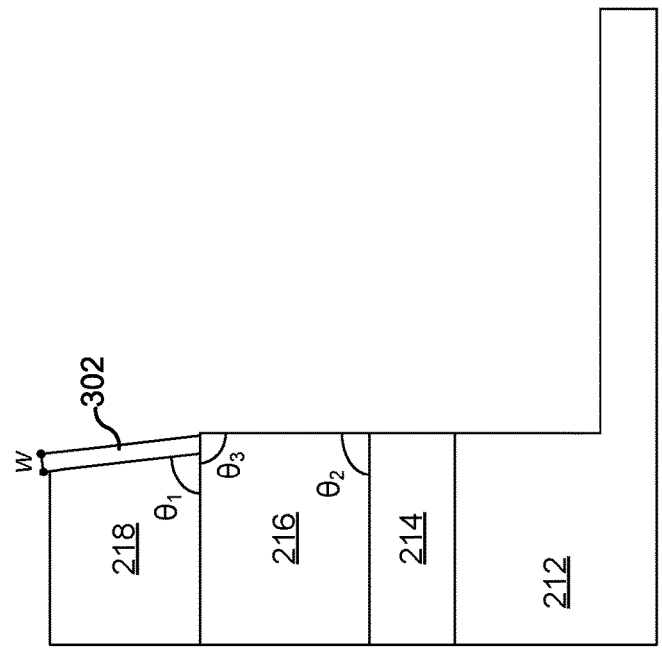
FIGS. 5A-5B are diagrams of example semiconductor structures described herein.
Figure 5B:
Figure 5B:
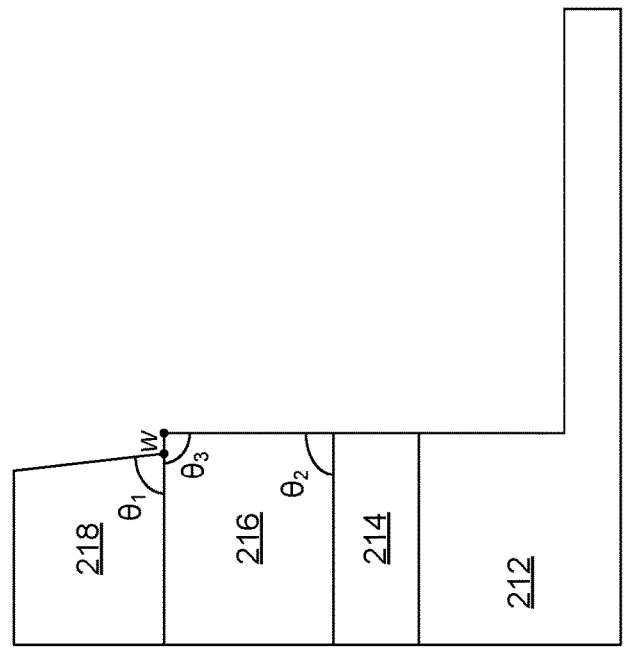

FIGS. 5A-5B are diagrams of example semiconductor structures 500 and 550, respectively, as described herein. As shown in FIGS. 5A-5B, a recess is formed in a substrate 212. The recess is additionally surrounded by a supporting dielectric layer 214 and a silicon waveguide 216. The silicon waveguide 216 may be protected by a cladding layer 218.

As shown in FIG. 5A, the example structure 500 includes a side slab 302. The side slab 302 may be formed after the cladding layer 218 is etched. As a result, a sidewall surface of the cladding layer 218 (e.g., facing the recess) forms an acute angle with a horizontal axis (e.g., a top surface of the silicon waveguide 216). Accordingly, as shown in FIG. 5A, $\theta_1$ is in a range from approximately 3° to approximately 87°. Because the cladding layer 218 has a non-zero depth, the angle will be at least 3°. By selecting an angle of no more than 87°, the cladding layer 218 will be sufficiently etched to form the recess (e.g., for insertion of a photonic device 202, as described in connection with FIG. 4J).

As further shown in FIG. 5A, the side slab 302 may have a width w in a range from approximately 2 nanometers (nm) to approximately 100 nm. By selecting a width of at least 2 nm, the side slab 302 will be deep enough to prevent tapering of the silicon waveguide 216. By selecting a width of no more than 100 nm, the side slab 302 will not interfere with insertion of the photonic device 202 into the recess.

As described in connection with FIGS. 4A-4J, the side slab 302 prevents tapering of the silicon waveguide 216 during etching. Accordingly, as shown in FIG. 5A, a sidewall surface of the silicon waveguide 216 (e.g., facing the recess) forms an angle with the horizontal axis (e.g., a top surface of the cladding layer 218) that is in a range from approximately 88° to approximately 92°. Accordingly, as shown in FIG. 5A, $\theta_2$ and $\theta_3$ are each in a range from approximately 88° to approximately 92°. By selecting an angle of at least approximately 88°, the silicon waveguide 216 will be within 2° of perpendicular and thus achieve nearly total reflection of escaping photons back into an active region of the photonic device 202 to be inserted into the recess. By selecting an angle of no more than approximately 92°, the silicon waveguide 216 will be within 2° of perpendicular and thus achieve nearly total reflection of escaping photons back into an active region of the photonic device 202 to be inserted into the recess.

As shown in FIG. 5B, example structure 550 does not include the side slab 302 because the side slab 302 was removed (e.g., as described in connection with FIG. 4H). Because the side slab 302 was used, a sidewall surface of the cladding layer 218 (e.g., facing the recess) still forms an acute angle with a horizontal axis (e.g., a top surface of the silicon waveguide 216). Accordingly, as shown in FIG. 5B, $\theta_1$ is in a range from approximately 3° to approximately 87°. Because the cladding layer 218 has a non-zero depth, the angle will be at least approximately 3°. By selecting an angle of no more than approximately 87°, the cladding layer 218 will be sufficiently etched to form the recess (e.g., for insertion of a photonic device 202, as described in connection with FIG. 4J).

As further shown in FIG. 5B, a top surface of the silicon waveguide 216 is at least partially exposed by the surface of the cladding layer 218 facing the recess. The exposed surface of the silicon waveguide 216 may have a width w in a range from approximately 2 nm to approximately 100 nm because the width of the side slab 302 was in the same range (e.g., as described in connection with FIG. 5A). Accordingly, a lowest point on the sidewall of the cladding layer 218 (e.g., a point contacting the top surface of the silicon waveguide 216) may be a distance from a highest point on the sidewall of the silicon waveguide 216 (e.g., a point contacting a top surface of the cladding layer 218) that is in a range from approximately 2 nm to approximately 100 nm because the width of the side slab 302 was in the same range (e.g., as described in connection with FIG. 5A).

As described in connection with FIGS. 4A-4J, the side slab 302 prevents tapering of the silicon waveguide 216 during etching. Accordingly, as shown in FIG. 5B, a sidewall surface of the silicon waveguide 216 (e.g., facing the recess) forms an angle with the horizontal axis (e.g., the top surface of the cladding layer 218) that is in a range from approximately 88° to approximately 92°. Accordingly, as shown in FIG. 5B, $\theta_2$ and $\theta_3$ are each in a range from approximately 88° to approximately 92°. By selecting an angle of at least approximately 88°, the silicon waveguide 216 will be within 2° of perpendicular and thus achieve nearly total reflection of escaping photons back into an active region of the photonic device 202 to be inserted into the recess. By selecting an angle of no more than approximately 92°, the silicon waveguide 216 will be within 2° of perpendicular and thus achieve nearly total reflection of escaping photons back into an active region of the photonic device 202 to be inserted into the recess.

As indicated above, FIGS. 5A-5B are provided as examples. Other examples may differ from what is described with regard to FIGS. 5A-5B.

Figure 6:
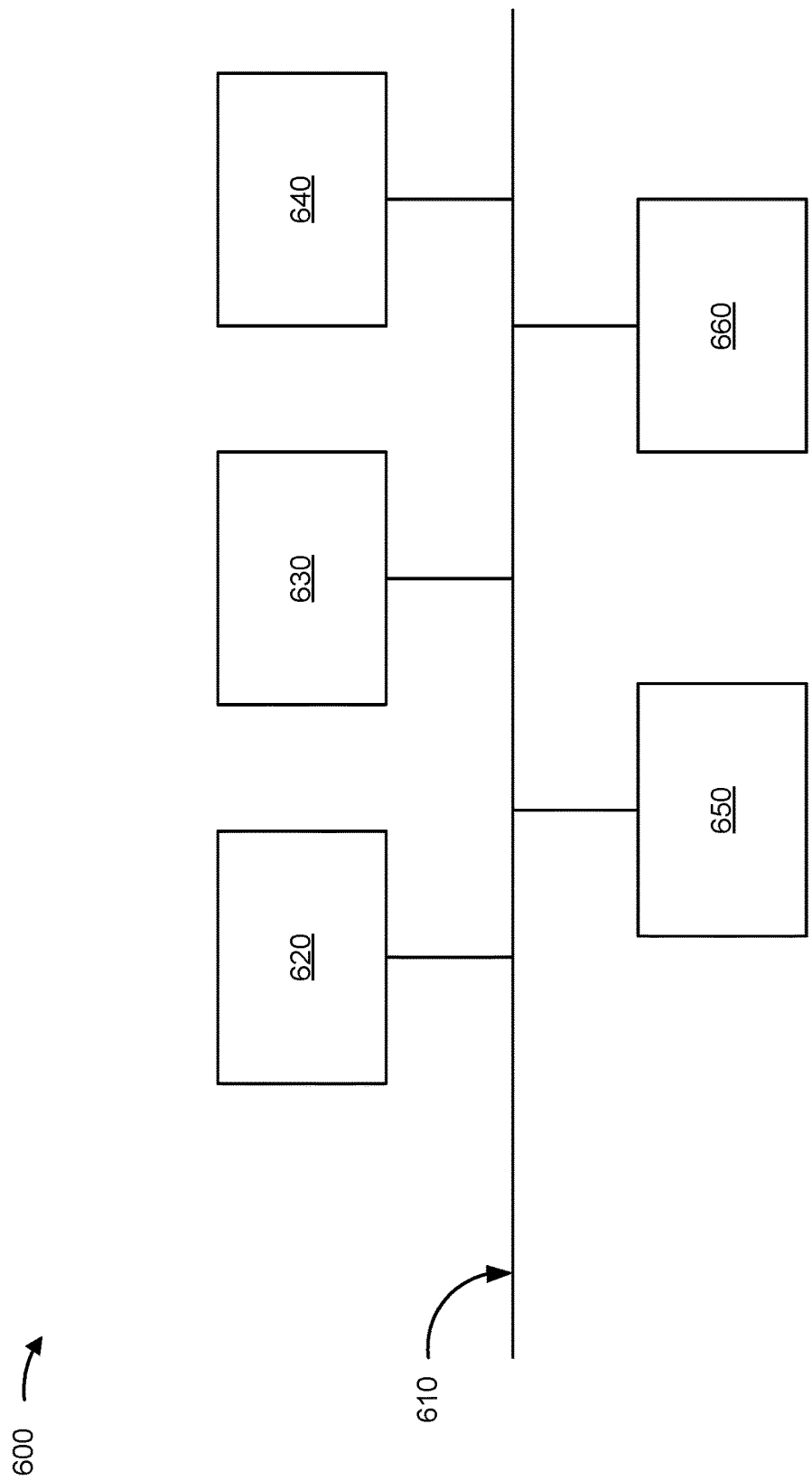
FIG. 6 is a diagram of example components of one or more devices of FIG. 1 described herein.

FIG. 6 is a diagram of example components of a device 600. In some implementations, one or more of the semiconductor processing tools 102-116 and/or the wafer/die transport tool 118 may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
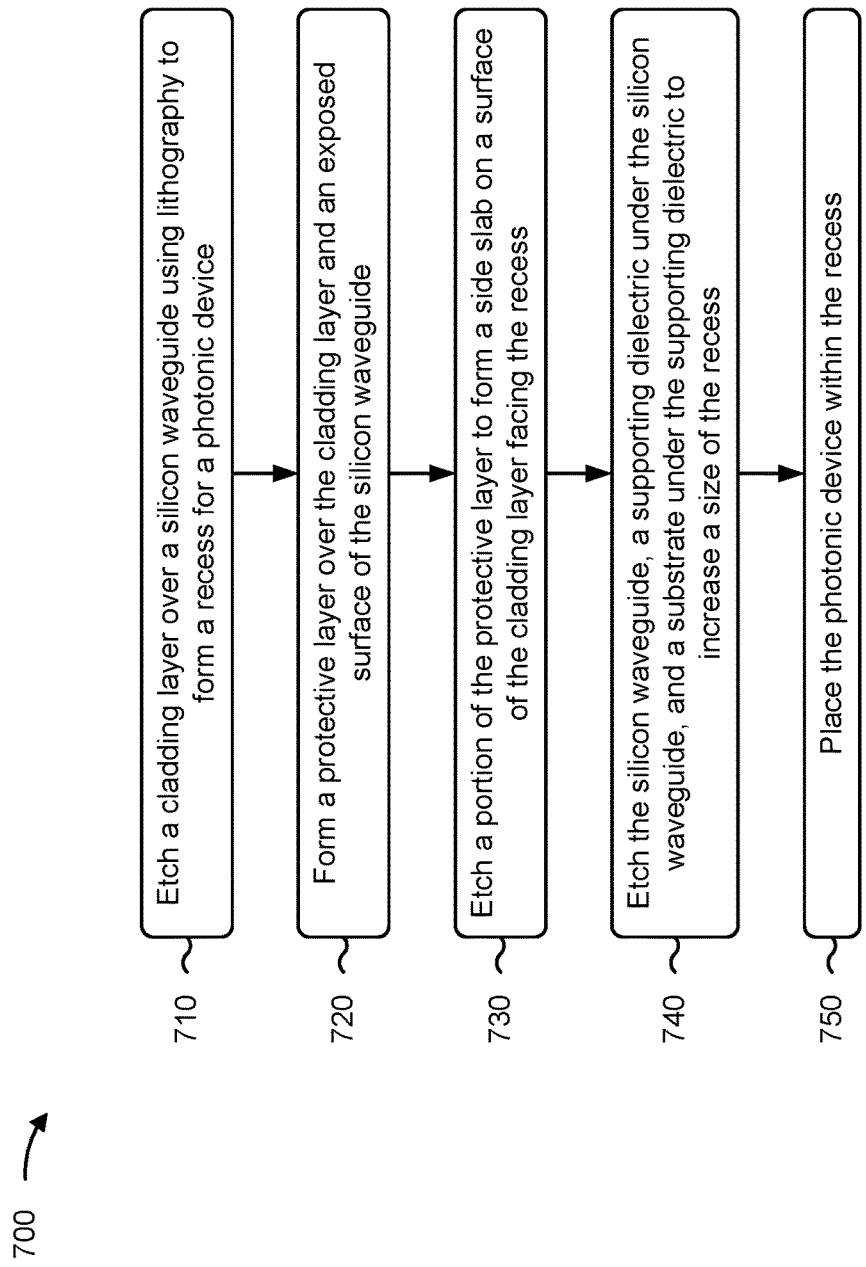
FIG. 7 is a flowchart of an example process associated with forming semiconductor structures described herein.

FIG. 7 is a flowchart of an example process 700 associated with methods for forming semiconductor waveguides. In some implementations, one or more process blocks of FIG. 7 may be performed by one or more semiconductor processing tools (e.g., one or more of the semiconductor processing tools 102-116). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include etching a cladding layer over a silicon waveguide using lithography to form a recess for a photonic device (block 710). For example, the one or more semiconductor processing tools 102-116 may etch a cladding layer 218 over a silicon waveguide 216 using lithography to form a recess for a photonic device 202, as described herein.

As further shown in FIG. 7, process 700 may include forming a protective layer over the cladding layer and an exposed surface of the silicon waveguide (block 720). For example, the one or more semiconductor processing tools 102-116 may form a protective layer 404 over the cladding layer 218 and an exposed surface of the silicon waveguide 216, as described herein.

As further shown in FIG. 7, process 700 may include etching a portion of the protective layer to form a side slab on a surface of the cladding layer facing the recess (block 730). For example, the one or more semiconductor processing tools 102-116 may etch a portion of the protective layer 404 to form a side slab 302 on a surface of the cladding layer 218 facing the recess, as described herein.

As further shown in FIG. 7, process 700 may include etching the silicon waveguide, a supporting dielectric under the silicon waveguide, and a substrate under the supporting dielectric to increase a size of the recess (block 740). For example, the one or more semiconductor processing tools 102-116 may etch the silicon waveguide 216, a supporting dielectric 214 under the silicon waveguide 216, and a substrate 212 under the supporting dielectric 214 to increase a size of the recess, as described herein.

As further shown in FIG. 7, process 700 may include placing the photonic device within the recess (block 750). For example, the one or more semiconductor processing tools 102-116 may place the photonic device 202 within the recess, as described herein.

Process 700 may include additional implementations, such as any single implementation or any combination of implementations described below and/or in connection with one or more other processes described elsewhere herein.

In a first implementation, process 700 further includes etching the side slab 302 before placing the photonic device 202 within the recess.

In a second implementation, alone or in combination with the first implementation, etching the side slab 302 includes using a wet etch to remove the side slab 302.

In a third implementation, alone or in combination with one or more of the first and second implementations, etching the silicon waveguide 216, the supporting dielectric 214, and the substrate 212 includes using one or more anisotropic etching processes to etch the silicon waveguide 216, the supporting dielectric 214, and the substrate 212 along a vertical direction.

In a fourth implementation, alone or in combination with one or more of the first through third implementations, the one or more anisotropic etching processes include one or more dry etching processes.

In a fifth implementation, alone or in combination with one or more of the first through fourth implementations, the one or more anisotropic etching processes include one or more lithographic exposure processes.

In a sixth implementation, alone or in combination with one or more of the first through fifth implementations, process 700 further includes forming a passivation layer 220 over at least the cladding layer 218 before placing the photonic device 202 within the recess.

In a seventh implementation, alone or in combination with one or more of the first through sixth implementations, forming the passivation layer 220 includes depositing the passivation layer 220 using epitaxial growth.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

In this way, depositing the side slab on the cladding layer before etching the supporting dielectric prevents tapering of the waveguide during etching of the supporting dielectric and the substrate. For example, the side slab may be deposited over the silicon waveguide and the cladding layer after etching the cladding layer. As a result, wave intensity and/or total internal reflection is improved, which improves an efficiency of the electronic device.

As described in greater detail above, some implementations described herein provide a semiconductor device. The semiconductor device includes a facet structure comprising a substrate, a supporting dielectric on the substrate, a silicon waveguide on the supporting dielectric, a cladding layer on the silicon waveguide, where a sidewall surface of the cladding layer forms an acute angle with a top surface of the silicon waveguide and is non-parallel with respect to a sidewall surface of the silicon waveguide; and a side slab over the sidewall surface of the cladding layer. The semiconductor device further includes a photonic device within the facet structure.

As described in greater detail above, some implementations described herein provide a semiconductor device. The semiconductor device includes a facet structure comprising a substrate, a supporting dielectric on the substrate, a silicon waveguide on the supporting dielectric, and a cladding layer on the silicon waveguide, where a sidewall surface of the cladding layer forms an acute angle with a top surface of the silicon waveguide and is non-parallel with respect to a sidewall surface of the silicon waveguide, the sidewall surface of the cladding layer and a sidewall surface of the silicon waveguide are separated by a distance in a range from approximately 2 nm to approximately 100 nm, and the top surface of the silicon waveguide is at least partially exposed by the sidewall surface of the cladding layer; and a photonic device within the facet structure.

As described in greater detail above, some implementations described herein provide a method. The method includes etching a cladding layer over a silicon waveguide using lithography to form a recess for a photonic device. The method includes forming a protective layer over the cladding layer and an exposed surface of the silicon waveguide. The method includes etching a portion of the protective layer to form a side slab on a surface of the cladding layer facing the recess. The method includes etching the silicon waveguide, a supporting dielectric under the silicon waveguide, and a substrate under the supporting dielectric to increase a size of the recess. The method includes placing the photonic device within the recess.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   a facet structure comprising:
      a substrate;
      a supporting dielectric on the substrate;
      a silicon waveguide on the supporting dielectric, wherein a first sidewall surface of the silicon waveguide coincides with a sidewall surface of the supporting dielectric;
      a cladding layer on the silicon waveguide,
         wherein a sidewall surface of the cladding layer forms an acute angle ($\theta_1$) with a top surface of the silicon waveguide and is non-parallel relative to a second sidewall surface of the silicon waveguide, and
         wherein the sidewall surface of the cladding layer and the first sidewall surface of the silicon waveguide are separated by a distance; and
      a side slab over the sidewall surface of the cladding layer; and
   a photonic device within the facet structure.

2. The semiconductor device of claim 1, wherein the side slab has a width (w) in a range from approximately 2 nanometers (nm) to approximately 100 nm.

3. The semiconductor device of claim 1, wherein the sidewall surface of the silicon waveguide forms an angle with a bottom surface of the cladding layer that is in a range from approximately 88° to approximately 92°.

4. The semiconductor device of claim 1, wherein a height of the side slab is larger than a height of the cladding layer.

5. The semiconductor device of claim 1, wherein the side slab comprises a material exhibiting selectivity to silicon oxide and silicon during etching.

6. The semiconductor device of claim 1, further comprising:
   a passivation layer formed over at least the cladding layer and the side slab, wherein the passivation layer has anti-reflective properties.

7. The semiconductor device of claim 6, wherein the passivation layer includes a first portion over a top surface of the side slab that is higher than a second portion of the passivation layer over a top surface of the cladding layer.

8. A semiconductor device, comprising:
   a facet structure comprising:
      a substrate;
      a supporting dielectric on the substrate;
      a silicon waveguide on the supporting dielectric, wherein a sidewall surface of the silicon waveguide coincides with a sidewall surface of the supporting dielectric; and
      a cladding layer on the silicon waveguide,
         wherein a sidewall surface of the cladding layer forms an acute angle ($\theta_1$) with a top surface of the silicon waveguide, and
         wherein the sidewall surface of the cladding layer and the sidewall surface of the silicon waveguide are separated by a distance; and
   a photonic device within the facet structure.

9. The semiconductor device of claim 8, wherein the facet structure further comprises a side slab over the sidewall surface of the cladding layer.

10. The semiconductor device of claim 9, wherein a height of the side slab is larger than a height of the cladding layer.

11. The semiconductor device of claim 8, further comprising:
    a passivation layer formed over at least the cladding layer and the top surface of the silicon waveguide.

12. The semiconductor device of claim 11, wherein the passivation layer includes a first portion over an exposed portion of the top surface of the silicon waveguide that is non-parallel with a second portion of the passivation layer over a second sidewall surface of the silicon waveguide.

13. The semiconductor device of claim 8, wherein the sidewall surface of the cladding layer is non-parallel relative to the sidewall surface of the silicon waveguide.

\* \* \* \* \*